US012762829B2

(12) United States Patent
Ayranci et al.

(10) Patent No.: US 12,762,829 B2
(45) Date of Patent: Oct. 13, 2026

(54) METHOD FOR DETERMINING ICHNOLOGICAL SUBSURFACE GEOLOGIC FORMATION

(71) Applicant: KING FAHD UNIVERSITY OF PETROLEUM AND MINERALS, Dhahran (SA)

(72) Inventors: Korhan Ayranci, Dhahran (SA); Umair Bin Waheed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 191 days.

(21) Appl. No.: 18/916,924

(22) Filed: Oct. 16, 2024

(65) Prior Publication Data

US 2025/0037413 A1 Jan. 30, 2025

Related U.S. Application Data

(63) Continuation of application No. 17/563,741, filed on Dec. 28, 2021, now Pat. No. 12,142,024.

(51) Int. Cl.
*G06V 10/44* (2022.01)
*E21B 25/00* (2006.01)
*G06V 10/764* (2022.01)

(52) U.S. Cl.
CPC ............ *G06V 10/454* (2022.01); *E21B 25/00* (2013.01); *G06V 10/764* (2022.01)

(58) Field of Classification Search
CPC .. G06V 10/454; G06V 10/764; G06V 10/772; G06V 10/82; G06V 10/774; G06V 10/26; G06V 10/255; G06V 20/10; G06V 20/70; E21B 25/00; E21B 2200/22; E21B 47/0025; E21B 47/002; E21B 21/06;
(Continued)

(56) References Cited

U.S. PATENT DOCUMENTS 10,410,092 B1 9/2019 Chen et al.
11,443,149 B2 * 9/2022 Francois ............. G01N 21/255
(Continued)

FOREIGN PATENT DOCUMENTS

CN 109284780 A 1/2019

OTHER PUBLICATIONS

Marochov, et al. ; Image Classification of Marine-Terminating Outlet Glaciers using Deep Learning Methods ; EGU, The Cryosphere Discussions ; Nov. 18, 2020 ; 45 Pages.
(Continued)

*Primary Examiner* — Michael S Osinski
(74) *Attorney, Agent, or Firm* — Oblon, McClelland, Maier & Neustadt, L.L.P.

(57) ABSTRACT

A system, method, and non-transitory computer readable medium for ichnological classification of geological images are described. The method of ichnological classification of geological images includes receiving a geological image by a computing device having circuitry including a memory storing program instructions and one or more processors configured to perform the program instructions, formatting the geological image to generate a formatted geological image, applying the formatted geological image to a deep convolutional neural network (DCNN) trained to classify bioturbation indices, and matching the formatted geological image to a bioturbation index class.

12 Claims, 11 Drawing Sheets

(58) Field of Classification Search

CPC ........ E21B 49/00; G06N 3/09; G06N 3/0464; G06N 3/08; G06N 3/045; G06N 3/04; G06N 3/047; G06N 3/0475; G06N 3/048; G06N 3/082; G06T 2207/20081; G06T 2207/20084; G06T 2207/30181; G06T 7/11

See application file for complete search history.

(56) References Cited

U.S. PATENT DOCUMENTS

| | | | | |
|---|---|---|---|---|
| 11,507,784 | B2 * | 11/2022 | Finnie | G06F 18/2433 |
| 11,898,435 | B2 * | 2/2024 | Pan | G06N 3/045 |
| 11,971,515 | B2 * | 4/2024 | Jiang | E21B 49/00 |
| 12,260,614 | B2 * | 3/2025 | Keum | G06V 10/7747 |
| 12,624,633 | B2 * | 5/2026 | Holmes | E21B 44/00 |
| 2014/0149041 | A1 * | 5/2014 | Sung | G01V 11/00 702/11 |
| 2015/0279093 | A1 | 10/2015 | Sung | |
| 2017/0061249 | A1 | 3/2017 | Estrada | |
| 2017/0200290 | A1 * | 7/2017 | Bhattiprolu | G06T 7/246 |
| 2020/0065606 | A1 | 2/2020 | Feng | |
| 2020/0225177 | A1 * | 7/2020 | Sungkorn | G01V 3/18 |
| 2021/0136993 | A1 * | 5/2021 | Revelli | A01B 69/008 |
| 2021/0319257 | A1 | 10/2021 | Francois | |
| 2022/0018982 | A1 | 1/2022 | Rueger | |
| 2022/0164594 | A1 | 5/2022 | LeFranc | |
| 2022/0335689 | A1 | 10/2022 | Zhu | |
| 2022/0413173 | A1 | 12/2022 | Jiang | |
| 2023/0036713 | A1 * | 2/2023 | Pattnaik | E21B 47/002 |
| 2023/0145880 | A1 | 5/2023 | Solum | |
| 2023/0154150 | A1 | 5/2023 | Barton Martinelli | |
| 2023/0154208 | A1 | 5/2023 | Desroziers | |
| 2023/0222773 | A1 | 7/2023 | Zarian | |
| 2023/0316713 | A1 | 10/2023 | Bouziat | |
| 2023/0332495 | A1 | 10/2023 | Noufal | |
| 2024/0029833 | A1 | 1/2024 | Thiry | |
| 2024/0193427 | A1 | 6/2024 | Falivene Aldea | |

OTHER PUBLICATIONS

Timmer, et al. ; Applying deep learning for identifying bioturbation from core photographs ; AAPG Bulletin, V. 105, No. 4 ; pp. 631-638 ; Apr. 2021.

Pires De Lima, et al. ; Pretraining Convolutional Neural Networks for Mudstone Petrographic Thin-Section Image Classification ; MDPI geosciences 11, 336 ; Aug. 11, 2021 ; 25 Pages.

* cited by examiner

METHOD FOR DETERMINING ICHNOLOGICAL SUBSURFACE GEOLOGIC FORMATION

CROSS-REFERENCE TO RELATED APPLICATIONS

The present application is a Continuation of U.S. application Ser. No. 17/563,741, now allowed, having a filing date of Dec. 28, 2021.

STATEMENT REGARDING PRIOR DISCLOSURE BY THE INVENTORS

Aspects of this technology are described in an article: "Learning Applications in Geosciences: Insights into Ichnological Analysis" published in Appl. Sci. 2021, 11, 7736, on 22 Aug. 2021, which is incorporated herein by reference in its entirety.

STATEMENT OF ACKNOWLEDGEMENT

The inventors acknowledge the financial support provided by a Natural Sciences and Engineering Research Council (NSERC) Discovery Grant and by start-up grants from the College of Petroleum and Geosciences, King Fahd University of Petroleum and Minerals KFUPM), Riyadh, Saudi Arabia.

TECHNICAL FIELD

The present disclosure is directed to classification of geological images based on automated bioturbation image recognition.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A trace fossil preserves the activities of animals and plants, and provides indirect past life information of such animals and plants. Ichnological analysis, including an assessment of a bioturbation index, is a study of fossil tracing, such as footprints, nests, burrows, tracks, trails, burrows, borings and feces. Ichnological analysis can be used for exploring the strata structure of Earth and for obtaining insights into oil and gas reservoirs, hydrocarbon exploration, minerals distribution etc. The ichnological analysis also provides valuable information on reservoir quality, paleodepositional conditions, and redox conditions. In the geoscience field, ichnological analysis is an essential tool as it yields fast and accurate results for labor-intensive research in areas such as petroleum exploration, heavy mineral analysis, facies analysis, and the monitoring of volcanoes.

An ichnological analysis may be performed based on obtaining a number of images of sediment cores over a specific area and extracting features associated with the images for analysis. For classifying the images based on the extracted features, a number of image classification techniques have been employed, such as a convolution neural network (CNN) and deep convolutional neural network (DCNN) based techniques. However, ichnological analysis based on these techniques may involve long hours of training, practice, visual observation, and specialized expertise. Conventional ichnological analysis techniques cannot perform the analysis efficiently, nor can they automatically classify geological images and determine a biturbation index.

Accordingly, it is one object of the present disclosure to provide systems and methods for an automatic ichnological classification of geological images determine the biturbation index classes of the geological images. The automatic ichnological classification is trained using transfer learning.

SUMMARY

In an exemplary embodiment, a method of ichnological classification of geological images is disclosed. The method includes receiving a geological image by a computing device having circuitry including a memory storing program instructions and one or more processors configured to perform the program instructions. The method includes formatting the geological image to generate a formatted geological image. The method further includes applying the formatted geological image to a deep convolutional neural network (DCNN) trained to classify bioturbation indices. The method further includes matching the formatted geological image to a bioturbation index (BI) class.

In another exemplary embodiment, a system for ichnological classification of geological images. The system includes a computing device having circuitry including a memory storing program instructions and one or more processors configured to perform the program instructions, a training set of geological images pre-labeled with bioturbation indices; and a deep convolutional neural network (DCNN) operatively connected to the computing device, wherein the DCNN is trained on the training set of prelabeled bioturbation indices to recognize bioturbation classes in a geological image.

In another exemplary embodiment, a non-transitory computer readable medium having instructions stored therein that, when executed by one or more processors, cause the one or more processors to perform a method of ichnological classification of geological images. The method includes receiving, by a computing device having circuitry including a memory storing program instructions and one or more processors configured to perform the program instructions, a geological image. The method includes formatting the geological image to generate a formatted geological image. The method further includes applying the formatted geological image to a deep convolutional neural network (DCNN) trained to classify bioturbation indices. The method further includes matching the formatted geological image to a bioturbation index class.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
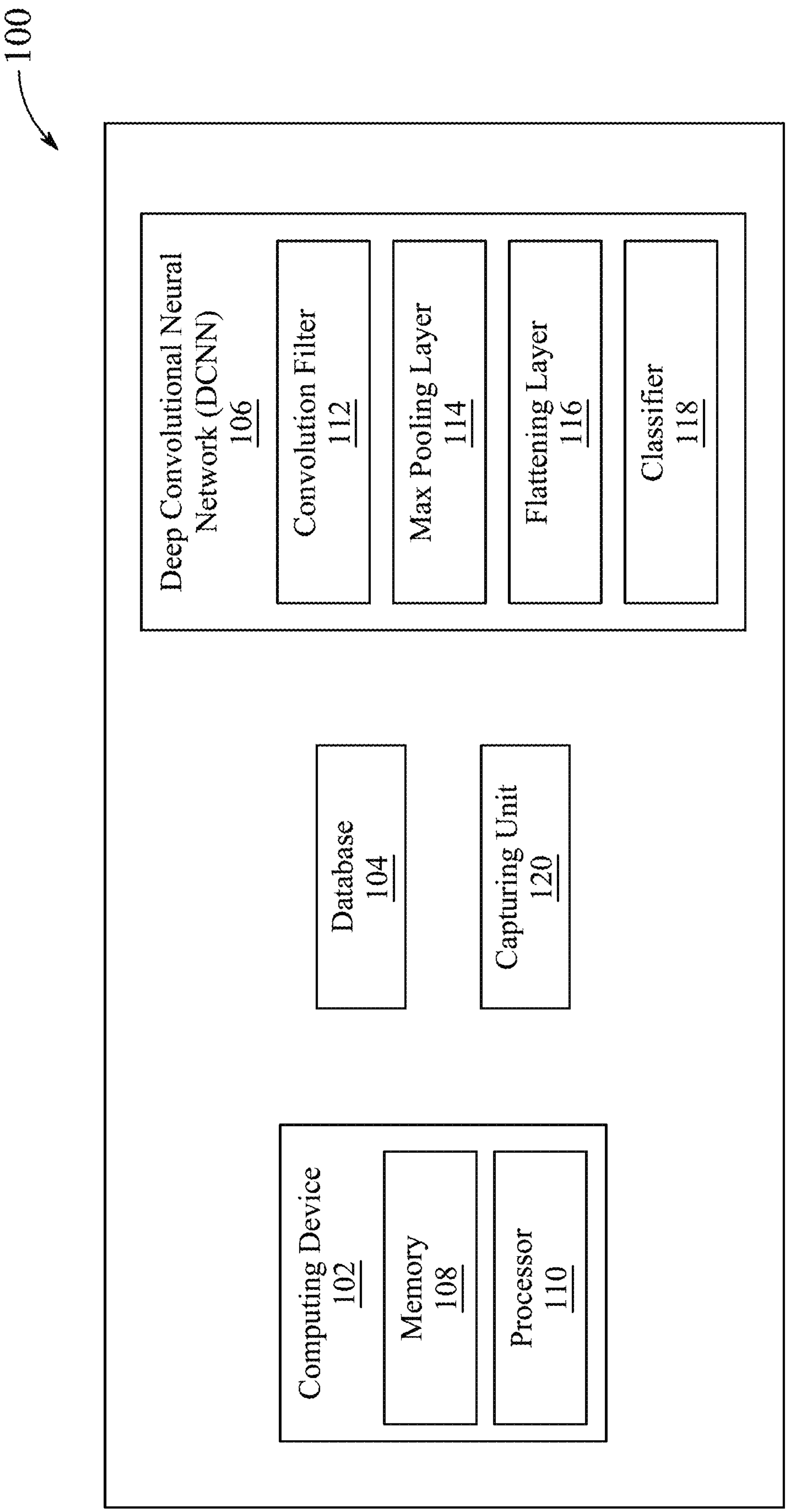
FIG. 1 illustrates a block diagram of a system for ichnological classification of geological images, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and a method of ichnological classification of geological images. The disclosure provides a solution for recognizing bioturbation classes in the geological images. An automated technique is described to determine bioturbation index in cores and outcrops by harnessing the capabilities of deep convolutional neural networks (DCNNs) as image classifiers.

In various aspects of the disclosure, non-limiting definitions of one or more terms that will be used in the document are provided below.

A term "stratum (plural: strata)" in geology and related fields may refer to a layer of sedimentary rock or soil, or igneous rock that was formed at the Earth's surface, with internally consistent characteristics that distinguish it from other layers. Sedimentary rock is composed of strata, where a number of parallel layers lie one upon another, laid down by natural processes. It is the fundamental unit in a stratigraphic column and forms the basis of the study of stratigraphy.

The term "bioturbation" refers to the reworking of soils and sediments by animals or plants. These include burrowing, ingestion, and defecation of sediment grains.

The term "ichnology" refers to the study of trace fossils, which preserve the activity of animals as recorded by their tracks, trails, burrows, and borings.

The term "transfer learning" is defined as a method of using pre-trained weights to initialize a convolution network and then re-training on dataset images.

FIG. 1 illustrates a block diagram of a system 100 for ichnological classification of geological images, according to one or more aspects of the present disclosure.

Referring to FIG. 1, the system 100 includes a computing device 102, a database 104, and a deep convolutional neural network (DCNN) 106.

The computing device 102 may be any device, such as a desktop computer, a laptop, a tablet computer, a smartphone, a smart watch, a mobile device, a Personal Digital Assistant (PDA) or any other computing device. According to an aspect, the computing device 102 may facilitate in performing ichnological classification of geological images. The computing device 102 is operatively connected to the database 104 and the DCNN 106.

Further, the computing device 102 has circuitry including a memory 108 storing program instructions and a processor(s) 110 configured to perform the program instructions. According to an aspect of the present disclosure, the processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 may be configured to fetch and execute computer-readable instructions stored in the memory 108. The memory 108 may be coupled to the processor 110 and may include any computer-readable medium known in the art including, for example, volatile memory, such as static random access memory (SRAM) and dynamic random access memory (DRAM) and/or nonvolatile memory, such as read only memory (ROM), erasable programmable ROM, flash memories, hard disks, optical disks, and magnetic tapes.

The database 104 includes a training set of geological images pre-labeled with bioturbation indices. There are six grades of bioturbation indices encompassed by the original BI definition: BI 0 to BI 6, where BI represents Bioturbation Index. BI 0 characterizes facies with no visible bioturbation, whereas BI 6 indicates complete biogenic homogenization of media, wherein no preserved primary physical sedimentary structures survive, and all sedimentary fabric is biologically induced. In an example, the geological images may have been labelled by an experienced ichnologist. Further, the geological images span the full range of bioturbation indices, i.e., from BI 0 to BI 6 (BI 0-6).

A tabular representation of a set of bioturbation indices is illustrated in Table 1 provide below.

TABLE 1

| Set of bioturbation indices | | |
|---|---|---|
| Bioturbation Index | Percent Bioturbated | Classification |
| 0 | 0 | No bioturbation |
| 1 | 1 to 4 | Sparse bioturbation, bedding distinct and few discrete traces or escape structure |
| 2 | 5 to 30 | Low bioturbation, bedding distinct, low trace density and escape structure often common |
| 3 | 31 to 60 | Moderate bioturbation, bedding boundaries sharp, traces discrete and overlap rate |
| 4 | 61 to 90 | High bioturbation, bedding boundaries indistinct and trace density with overlap common |
| 5 | 91 to 99 | Intense bioturbation, bedding completely disturbed (just visible), limited reworking and later burrows discrete |
| 6 | 100 | Complete bioturbation and sediment reworking because of repeated overprinting |

According to an aspect of the present disclosure, each geological image of the training set is a three channel image having a size of 224×224 pixel. The three channels include a red channel, a blue channel, and a green channel. Each geological image of the training set has low-level features and high-level features. The low level features include lines, edges and dots. The high-level features include objects.

The geological images were collected from a variety of subsurface cores and outcrop exposures representing siliciclastic sedimentary facies from several Cretaceous-aged stratigraphic formations in the Western Canada Sedimentary Basin, Alberta Canada. These geological images have a large variation in individual trace fossils present in the facies, including Asterosoma, Chondrites, Conichnus, Cylindrichnus, Diplocraterion, Macaronichnus, Ophiomorpha, Palaeophycus, Planolites, Phycosiphon, Piscichnus, Rhizocorallium, Rossellia, Schaubcylindrichnus, Siphonichnus, Skolithos, Teichichnus, and Thalassinoides, as well as biodeformation structures and escape structures.

The geological images were captured from sandstone and siltstone facies with some mudstone intervals, as well as rare conglomerate beds and mud-clast breccia units. The geological images were collected from facies recording relatively shallow-water settings, such as estuaries, bays, shorefaces, offshore-shelf, delta fronts, and prodeltas. A wide range of physical sedimentary structures were also included, having low-angle to horizontal parallel lamination, high-angle cross-stratification, trough cross-stratification, hummocky cross-stratification, current ripple lamination, oscillation ripple lamination, normally graded bedding, fluid mud drapes, gravel lags, isolated clasts and rip-up clasts, loading and flame structures, convolute bedding and other soft-sediment deformation structures, syneresis cracks, and various types of concretions.

According to aspects of the present disclosure, the DCNN 106 is a class of deep networks formed by a series of interconnected neurons. The DCNN 106 includes a plurality of convolution filters 112, a max pooling layer 114, a flattening layer 116, and a classifier 118. The plurality of convolution filters 112 may include a series of 3×3 convolution filters. Further, the series of 3×3 convolution filters are divided into blocks, where each 3×3 convolution filter is configured to generate a set of weights. The max pooling layer 114 is configured to downsample an output of each block of the series of 3×3 convolution filters. Further, the flattening layer 116 is configured to generate a one dimensional array of pixel images from an output of a last block. The classifier 118 is configured to match the one dimensional array of pixel images to a bioturbation class and generate a bioturbation index.

The DCNN 106 was trained on the training set of geological images pre-labeled with bioturbation indices. The DCNN 106 was trained to classify the bioturbation indices. In an aspect, the DCNN 106 was configured to classify the training set of geological images into bioturbation index classes. The bioturbation index classes may be interchangeably referred to as bioturbation classes. In other words, the DCNN 106 was configured to recognize bioturbation classes in each geological image. In an example, the bioturbation index classes include unbioturbated images, moderately bioturbated images, and intensely bioturbated images. The unbioturbated images have no visible bioturbation and the moderately bioturbated images have 1% to 30% bioturbation. Further, the intensely bioturbated images have 31% to 100% bioturbation. In an example, the unbioturbated images, the moderately bioturbated images, and the intensely bioturbated images correspond to B1 0, BI 1-2, and BI 3-6, respectively. According to an aspect, the training of the DCNN 106 may or may not be performed in real-time, i.e., the DCNN 102 may be pre-trained.

The DCNN 106 includes a large number of trainable parameters that require a huge amount of labeled data. To avoid the need for manually labeling the geological images, a transfer learning technique is used that relies on storing knowledge gained while solving one problem and then applying it to a different but related problem. Therefore, instead of training the DCNN 106 from scratch, an image recognition architecture was used. In a non-limiting example, the image recognition architecture may be a VGG-16 convolutional neural network model. The VGG-16 convolutional neural network model performs with accuracy and computational efficiency. In an example, learned parameters of the VGG-16 convolutional neural network derived from the training on a dataset may be used. Use of such transfer learning technique allows the system 100 to attain a high classification performance with a minimal amount of manual labeling required. Other examples of transfer learning models, such as VGG-19 not discussed are contemplated herein.

VGG stands for Visual Geometry Group; it is a standard deep Convolutional Neural Network (CNN) architecture with multiple layers. The "deep" refers to the number of layers with VGG-16 or VGG-19 consisting of 16 and 19 convolutional layers.

The VGG architecture is the basis of object recognition models. Developed as a deep neural network, the VGGNet, which is a Convolutional Neural Network architecture, also surpasses baselines on many tasks and datasets including ImageNet.

In a non-limiting example, the training dataset may be sourced from ImageNet, which is an image database organized according to a hierarchy in which each node of the hierarchy is depicted by hundreds and thousands of images.

Figure 2:
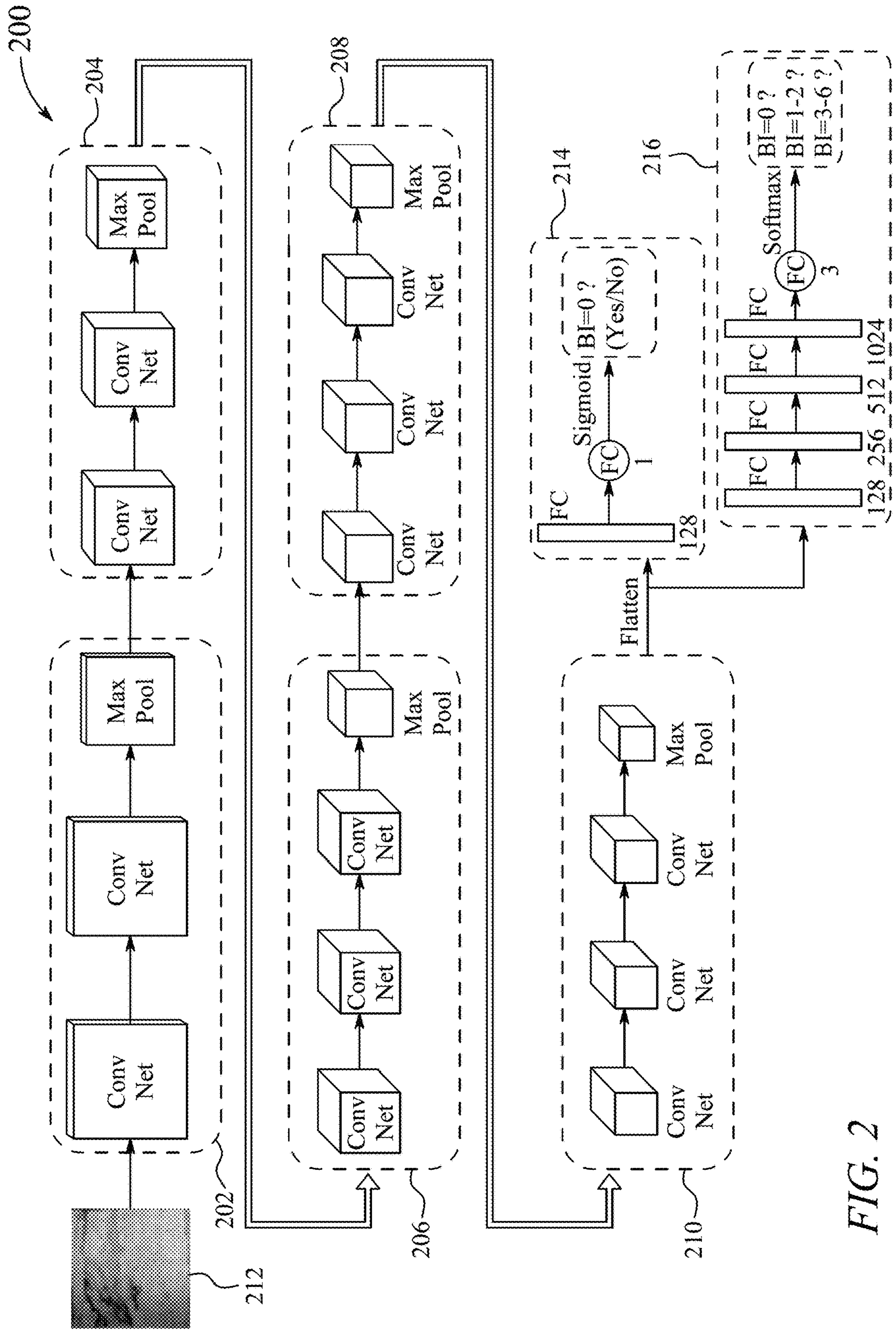
FIG. 2 illustrates an architecture of a deep convolutional neural network (DCNN) based on VGG-16, according to aspects of the present disclosure.

FIG. 2 illustrates an architecture 200 of the DCNN 106 based on VGG-16 with fully connected layers. The architecture 200 describes the routines for both binary and multi-class classifications.

As shown in FIG. 2, the DCNN 106 includes 16 layers composed of 3×3 convolution filters. A first portion of the 3×3 convolution filters is divided into four blocks including a first block 202, a second block 204, a third block 206, and a fourth block 208. Further, a second portion of the 3×3 convolution filters includes a fifth block 210. The input to the DCNN 106 is a 224×224 pixel three channel image 212, for which the biturbation index class is to be determined. The three channels include a red channel, a green channel, and a blue channel for RGB images. Further, the low-level features of the input image 212, such as lines, edges, or dots, are learned by the 3×3 convolution filters in the shallow parts, i.e, initial convolution filters for which weights are trained with random initialization. In the deeper parts, (i.e, the blocks of the second portion, trained on the geologic training dataset), the high-level features of the input image 212 such as objects are more detectable. In an aspect, parameters for the first block 202, the second block 204, the third block 206, and the fourth block 208 were fixed by training the VGG-16 on the ImageNet dataset, and parameters were not fixed for the fifth block 210 and the fully connected layers. That is, the first block 202, the second block 204, the third block 206, and the fourth block 208 are frozen blocks and the fifth block 210 and the fully connected layers are trainable. The use of transfer learning significantly reduced the computation time needed for training the DCNN 206 and reduced the need for a large number of training samples, as only the fifth block 210 and the fully connected layers had trainable parameters. This resulted in efficient training and improved classification accuracy.

In an aspect, max pooling is applied to the first block 202 to downsample the input image 212 to a 112×112 pixel image. Further, max pooling is applied to the second block 204 to downsample the 112×112 pixel image to 56×56 pixel image. Also, max pooling to the third block 206 to downsample the 56×56 pixel image to 28×28 pixel image, and max pooling is applied to the fourth block 208 to downsample the 28×28 pixel image to 14×14 pixel image. Then max pooling is applied to the fifth block 210 to downsample the 14×14 pixel image to 7×7 pixel image. The 7×7 pixel images are then flattened to generate a one dimensional array of pixel images. The one dimensional array is then applied to a binary classification block 214. The one dimensional array is then matched to a bioturbation class and the bioturbation index for each geological image of the training set is provided as an output.

Further, the architecture 200 describes routines for both binary and multi-class classification. As shown in FIG. 2, the binary classification block 214 outputs a determination of whether the input image 212 is bioturbated or not bioturbated. Further, a multi-class classification block 216 received the flattened one dimensional array and outputs the bioturbation class of the input image 214 in terms of its bioturbation index.

The manner in which the DCNN 106 was trained on the training set of geological images pre-labeled with bioturbation indices is described in greater detail henceforth.

Initially, a total of 1303 color geological images of 4 to 8 cm in size were selected. The 1303 images have different bioturbation indices. The default input size for the DCNN 106 may be 224×224 pixels. In an aspect, a resize operation may be performed on the geological images to preserve original sedimentary and ichnological structures without distortion.

Further, bioturbation indices of the geological images were identified and labeled in three bioturbation index classes—unbioturbated (0%), moderately bioturbated (1%-30%), and intensely bioturbated (31%-100%), corresponding to BI 0, BI 1-2, and BI 3-6, respectively. Out of 1303 geological images, 530 geological images represented BI 0, 360 geological images represented BI 1-2, and 413 geological images represented BI 3-6. From these 1303 geological images, 1041 geological images were used as the training set (i.e., 79.9% of the overall geological images) and the remaining 262 geological images (i.e., 20.1% of the overall geological images) were used as test data.

Figure 3:
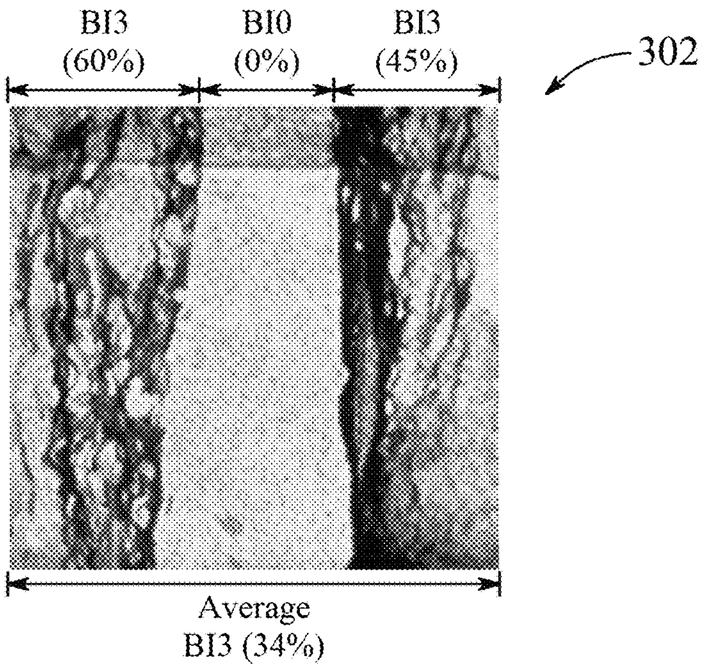
FIG. 3 represents an exemplary geological image showing various bioturbation indices, according to aspects of the present disclosure.

According to an aspect, the DCNN 106 may identify geological images that encompass more than one facies possessing different bioturbation indices. In an example, each geological image may include a plurality of strata layers including a first strata layer and a second strata layer. In an aspect, for geological images that encompass more than one facies possessing different bioturbation indices, the average bioturbation index values of each strata layer and their thickness was taken into consideration, particularly for the ones that are close to the lower-end or upper-end cut-off values. Between BI 1-2 and BI 3-6, 74 geological images encompassed more than one facies different bioturbation indices. Bioturbation indices of the geological images are calculated using Equation (1) provided below.

$$BI_{avg} = \frac{(T_a \times BI_a) + (T_b \times BI_b)}{\sum T} \quad (1)$$

where, $BI_{avg}$ is an average bioturbation index, $T_a$ represents a thickness of a first strata layer, $T_b$ represents a thickness of a second strata layer, $BI_a$ represents a bioturbation index of the first strata layer, $BI_b$ represents a bioturbation index of the second strata layer; and $\Sigma T$ represents a thickness of a geological image. An exemplary core geological image 302 showing various bioturbation indices expressed by bioturbation index in different facies is shown in FIG. 3.

To expand the existing labeled data and to insert regularizing effects into the classification process, data augmentation is used during training of the DCNN 106. Data augmentation is a commonly used technique in model training, where new samples are artificially created from the training data by applying some basic operations such as rotation, cropping, flipping, scaling, shifting, etc. This allows a network to detect complex internal features more easily when training data is limited. To prevent distortion of the particular characteristics of the geological images, data augmentation creates new samples randomly, applying horizontal flip, and 10% shifts in the width and height to the training data. The training set is augmented before applying to the DCNN 106. Augmenting includes any one of rotating, cropping, flipping, scaling, and shifting. The training set is augmented by randomly selecting an image to augment, a horizontal flip is applied to the selected image to generate a flipped image, and the flipped image is added to the training set. In some aspects, the training set is augmented by randomly selecting an image to augment, a 10% shift is applied to one of a height and a width of the selected image to generate a shifted image, and the shifted image is added to the training set.

Examples and Experiments

The following examples are provided to illustrate further and to facilitate the understanding of the present disclosure.

Experimental Data and Analysis

First Experiment: Determining the Presence of Bioturbation in Images

The first experiment is carried out for differentiating unbioturbated facies (BI 0) from bioturbated facies (BI 1-6).

Figure 4:
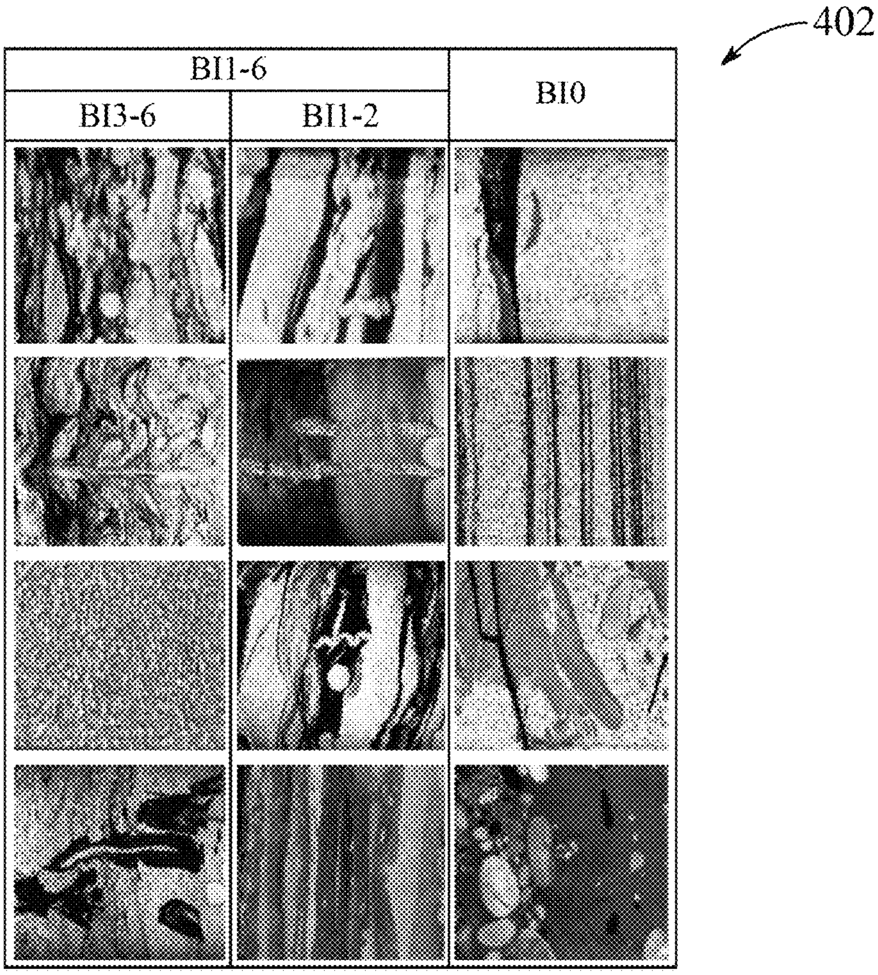
FIG. 4 illustrates a set of geological images pre-labled with bioturbation indices, according to aspects of the present disclosure.

The DCNN 106 is trained to differentiate unbioturbated facies (BI 0) from bioturbated facies (BI 1-6). As described earlier, the DCNN 106 is trained with the training set of geological images pre-labeled with bioturbation indices. In an aspect, the DCNN 106 is trained using BI 0 geological image and BI 1-6 geological images. FIG. 4 illustrates an example set 402 of geological images pre-labeled with bioturbation indices. In the experiment, 1303 core and outcrop images were labeled based on their bioturbation indices. The DCNN 106 was run ten times on a testing data set of geological images comprising 106 BI 0 and 156 BI>0 test images. Accuracy values range between 93.8% and 97.7%, with an average accuracy value of 95.9%. The results of the first experiment are illustrated in Table 2 provided below.

TABLE 2

Results of the first experiment

| | Total Number of Images | Number of Training Images | Number of Test Images | Accurate | Misclassified |
|---|---|---|---|---|---|
| BI 0 | 530 | 424 | 106 | 104 (98.1%) | 2 (1.9%) |
| BI 1-6 | 773 | 617 | 156 | 152 (97.4%) | 4 (2.6%) |
| Total | 1303 | 1041 | 262 | 256 (97.7%) | 6 (2.3%) |

The data provided in Table 2 represents that among BI 0 test images, 98.1% test images are correctly identified and among BI 1-6 test images, 97.4% test images are correctly classified. Complex primary structure (for example, hummocky cross-stratification and amalgamated current ripples) and several non-biogenic structures that resembled biogenic features (for example, mudstone rip-up clasts, concretions, gravel lags, scattered coal fragments, flame structures, fractures/cracks, and soft-sediment deformation) were correctly classified. Further, the DCNN 106 accurately classified outcrop images along with core images and facies characterized by various grain sizes (such as, fine-grained sand to travel), and ignored human-made features such as pen marks and surface stains.

Figure 5A:
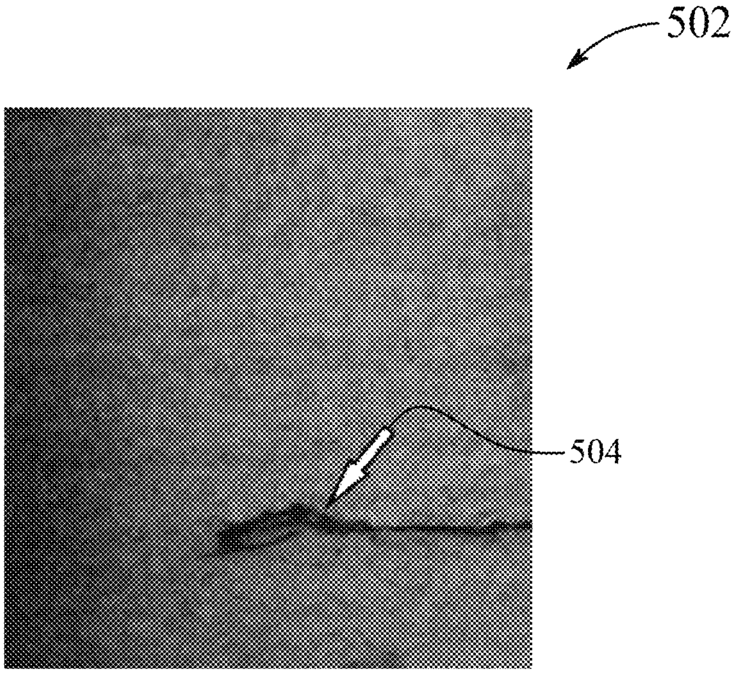
FIG. 5A illustrates representative misclassified images, according to aspects of the present disclosure FIG. 5B illustrate another representative misclassified images, according to aspects of the present disclosure.
Figure 5B:
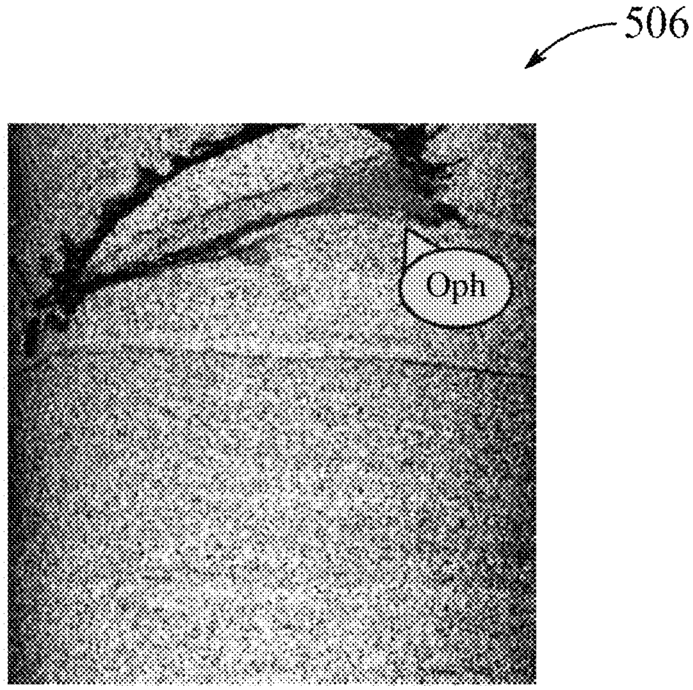

Further, misclassified images were also analyzed and compared with similar images in the training data set. The results shown in Table 2 illustrate that only 1.9% of the BIO test images were misclassified as BI 1-6 and 2.6% of the BI 1-6 test images were misclassified as BI 0. The misclassified images display either rare, deformed mud drapes resembling bioturbation, extremely diminutive trace fossils, individual ichnogenera for which there were few or no examples in the training data set, or sediment-swimming structures for which there were no images in the training data set. FIG. 5A and FIG. 5B illustrate representative misclassified images. FIG. 5A shows an image 502 showing a deformed mud-drape (represented by arrow 504). The deformation caused the mud-drape to resemble bioturbation labeled as BI 1-2 present in some of the other images in the training images. FIG. 5B shows an image 506 (an individual Ophiomorpha), which is misclassified owing to the lack of similar images in the training dataset.

Second Experiment: Classification of Images Based on Three Bioturbation Index Classes The second experiment was performed to test whether three class bioturbation index classification can be constructed using the DCNN 106. During the second experiment, the images were grouped into three categories-unbioturbated (BI 0), moderately bioturbated (BI 1-2), and intensely bioturbated (BI 3-6). The BI 1-6 images that were used in the first experiment were divided into two classes as BI 1-2 and BI 3-6. The DCNN 106 was run ten times on the test data set comprising 106 BI 0, 73 BI 1-2, 83 BI 3-6 test images. The results of the second experiment are illustrated in Table 3 provided below.

TABLE 3

Results of the second experiment

| | Total Number of Images | Number of Training Images | Number of Test Images | Accurate | Misclassified |
|---|---|---|---|---|---|
| BI 0 | 530 | 424 | 106 | 100 (94.3%) | 6 (5.7%) |
| BI 1-2 | 360 | 287 | 73 | 62 (84.9%) | 11 (15.1%) |
| BI 3-6 | 413 | 330 | 83 | 71 (85.5%) | 12 (14.5%) |
| Total | 1303 | 1041 | 262 | 233 (88.9%) | 29 (11.1%) |

The data provided in Table 3 illustrates that the total accuracy of the 233 images was 88.9%, in which the majority of the B1 0 images was correctly classified, similar to results of the first experiment. Given that the BI 0 data set was identical in both the first experiment and the second experiment, correctly identified images are also similar. Therefore, 94.3% of the BI 0 images were correctly classified. However, the second experiment showed slightly different accuracy results when the BI 1-6 class was divided into BI 1-2 and BI 3-6 classes. Among the 73 BI 1-2 test images, 84.9% were correctly classified. From the 83 BI 3-6 test images, 85.5% were correctly classified.

Figure 6:
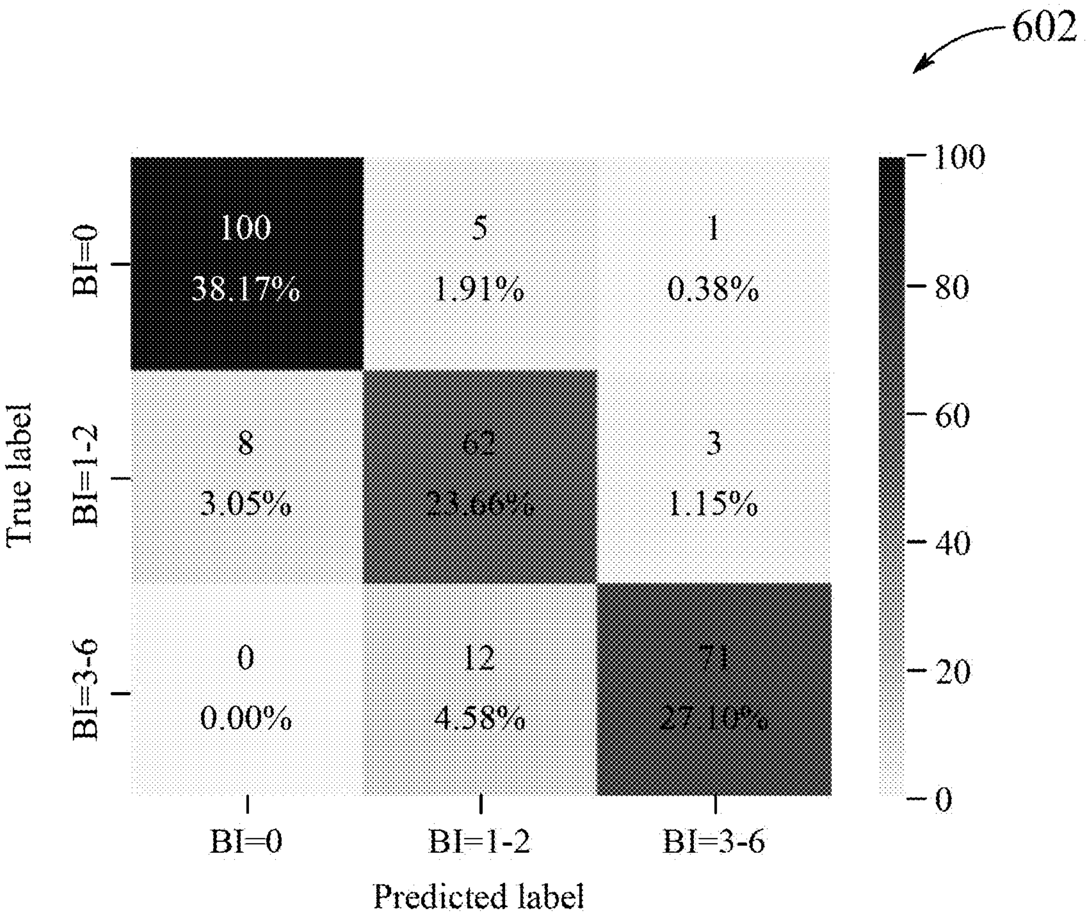
FIG. 6 shows a classification matrix for classification performance for bioturbation index classes, according to aspects of the present disclosure.

FIG. 6 shows a classification matrix 600 for the second experiment, which shows the classification performance for the three bioturbation index classes for the 233 image set. The lowest accuracy obtained was 85.1%, whereas the highest accuracy obtained was 88.9%, with an average accuracy value of 86.8% for the three class classification. In FIG. 6, for example, 106 of the images were BI=0 images, but 5 images were misclassified as BI=1-2 images and one was misclassified as a BI=3-6 image. The bar on the right side of the graph shows that the highest accuracy was obtained in classifying BI=0 images and the lowest accuracy was found in classifying BI=3-6 images. These results illustrate the increased difficulty in classifying images with many bioturbation features.

In the second experiment, only 5.7% of the BI 0 images were misclassified, with most of these either identical to or similar to the images that are misclassified in the first experiment. The second experiment shows lower precision in BI 1-2 images, with 15.1% misclassified images. The majority of these misclassified images were labeled as BI 0 images. These images showed very low bioturbation indices (the lower range of BI 1), large concretions, and single isolated trace fossils. Precision in predicting BI 3-6 images is slightly higher compared to BI 1-2 images, with only 14.5% misclassified. The majority of these misclassified images occur at the lower limits of BI 3 (e.g., approximately 31-45%) and are thus intergradational with the upper limits of BI 2.

Figure 7A:
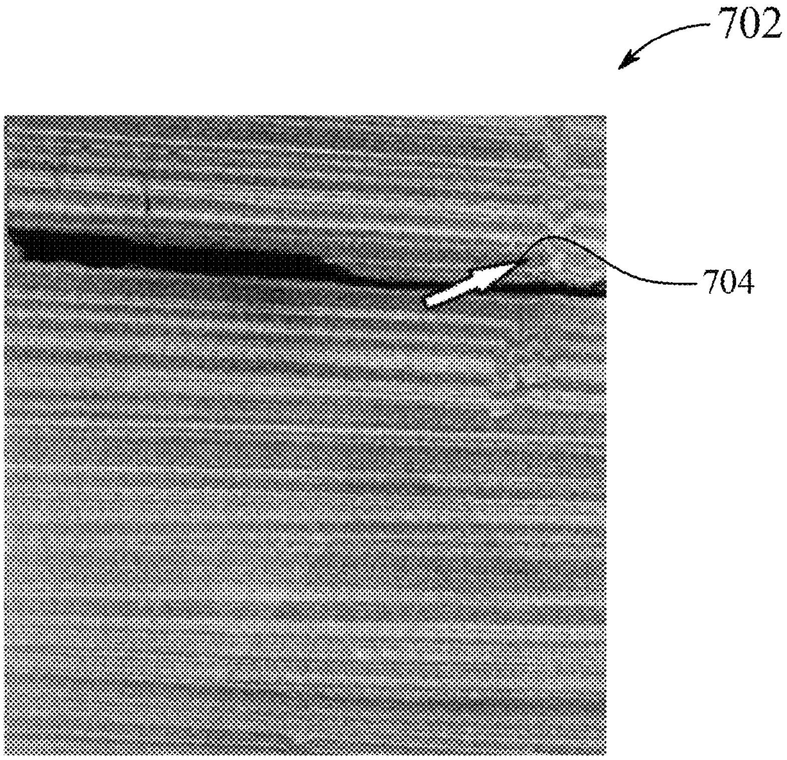
FIG. 7A illustrates an example of a misclassified image, according to aspects of the present disclosure.
Figure 7B:
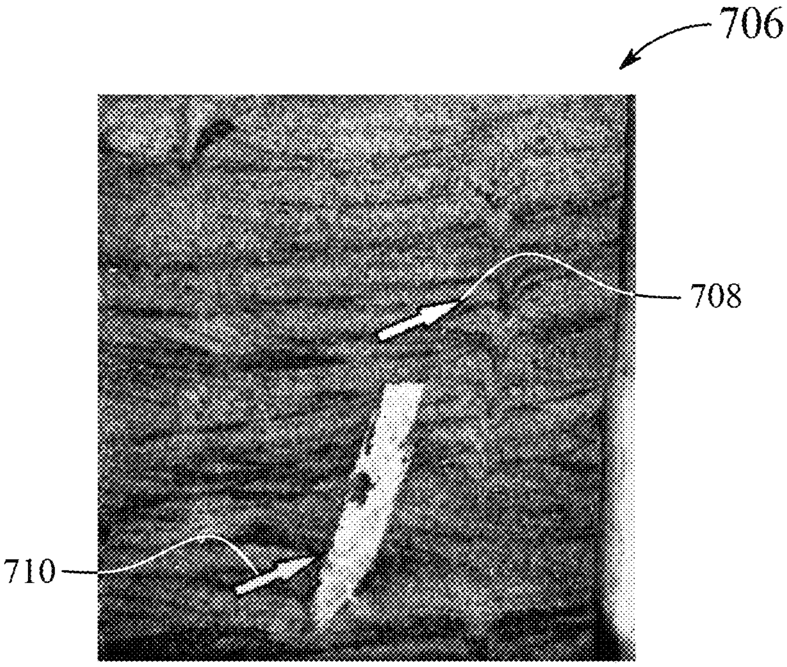
FIG. 7B illustrates another example of a misclassified image, according to aspects of the present disclosure.

FIG. 7A and FIG. 7B show examples of two misclassified images in the second experiment. The two misclassified images display diminutive escape structures expressed only by minor disruptions of laminae, unlike the geological images included in the training data set. In particular, FIG. 7A shows an image 702 displaying parallel lamination with a small escape structure (shown by arrow 704) and FIG. 7B shows an image 706 showing a large escape structure (shown by arrow 708) along with a smeared burrow (e.g., Cylindrichnus) or mineral growth (shown by arrow 710).

To avoid the issue of lack of statistical diversity of the training dataset after the BI 1-6 images into two subclasses in the second experiment, an additional 82 images were added into the BI 1-2 class and 82 images were added into the BI 3-6 class and the DCNN 106 was run ten times.

Once the DCNN has been trained, new images from a geological formation can easily be classified by their bioturbation indices. A geologist may take core samples from different strata of a geologic formation. In an aspect, the geological image may be obtained based on drilling cores through a substrate. The drilling cores may be sliced into portions. In an example, drilling cores may be sliced into portions using radar, ultrasound, seismic, or other such techniques. According to an aspect, a capturing unit may be configured to capture pictures of the cores to obtain the geological image. In an example, the capturing unit may be a camera, such as a Kinect® camera. In an aspect, the computing device 102 may be configured to receive the geological image from the capturing unit, format the geological image and apply the geological image to the trained DCNN. The classifier of the DCNN determines whether the geological image is bioturbated or unbioturbated (BI 0), and further classifies the bioturbated images into either the BI 1-2 class or the BI3-6 class.

The core slices may be automatically imaged by an image capture system. The image capture system may have an ultrasonic slicer which slices the cores into portions. Each sliced portion may be collected automatically as it is sliced by a moving belt. The moving belt may move the sliced portion beneath a camera, which record a digital image of the sliced portion. The camera may automatically record digital images at set intervals, for example, every four seconds. Alternatively, a position sensor may register the presence of the sliced portion in the field of focus of the camera, and send a signal which activates the camera to record a digital image of the sliced portion. These digital images may then be formatted by an image processor of the computing device and applied to the DCNN for classification.

A contrast enhancement step may be added as a part of the image capture. In a preferred embodiment a core sample or core sample slice is heated or exposed to thermal or chemical treatment prior to image capture. Heating, for example to a temperature of 50° C. or higher, 100° C. or higher, 150° C. or higher, 200° C. or higher, or 300° C. may function to enhance image contrast between layers or materials containing different amounts of organic material or different amounts of bioturbation. In an especially prefer embodiment the core sample (slice) is heated at a high rate, for example 5° C./second, 8° C./second, 10° C./second, or 15° C./second (±2° C.). The temperature of a matrix portion of the sample is monitored and images captured as soon as a target peak temperature is reached, such as 50° C., 100° C., 150° C., 200° C., 250° C. or 300° C. Rapid heating to target temperature may improve contrast between matrix and bioturbation portions of the sample due to different rates of heat conductivity or heat transmissibility. Chemical agents may also be used to enhance contrast between portions of the core sample and thereby easae identification of bioturbation. An oxidizing agent such as permanganate ion maybe used to contact a surface of the sample thereby leaving different rates of oxidation that may correlate to areas of bioturbation thus enhancing image contrast in the sample.

In response to receiving the geological image, the computing device 102 formats the geological image to generate a formatted geological image. In an example, the computing device 102 may format the geological image by resizing the received geological image to match an image input size of the DCNN 106.

According to an aspect, the computing device 102 may apply the formatted geological image to the DCNN 106 that is trained to classify bioturbation indices. In an aspect, the formatted image is applied to the series of 3×3 convolution filters 112. Each convolution filter generates a set of weights. The weights of a first portion of the series of 3×3 convolution filters 112 are freezed (fixed). Further, the weights of a second portion of the series of 3×3 convolution filters 112 are trained using the training set. The DCNN 106 is configured to recognize the objects.

In an aspect, computing device 102 may determine whether each formatted geological image includes one of a single layer of strata and a plurality of layers of strata. When the formatted geological image has a single layer of strata, the computing device 102 may apply the formatted geological image to the DCNN 106 to match the formatted geological image to a bioturbation index class. Further, when the formatted geological image includes a plurality of layers of strata, the computing device 102 may identify one or more strata layers within the formatted geological image. Further, the computing device 102 may measure a thickness of each strata layer of the formatted geological image. The computing device 102 may be configured to determine the bioturbation index of the formatted geological image by calculating an average bioturbation index, BIavg, using Equation (1). Accordingly, the trained DCNN 106 is employed to obtain high classification accuracies.

The present disclosure can be crucial in oil and gas exploration through reducing uncertainty, lowering the cost and labor time of experts, maximizing efficiency by directing the expert's attention to more problematic intervals (i.e., those yielding low accuracy results), and in academia by facilitating accurate, reliable, comparable, and consistent paleoenvironmental interpretations. Aspects of the present disclosure can be used by any geologist with limited or no ichnological training.

Figure 8:
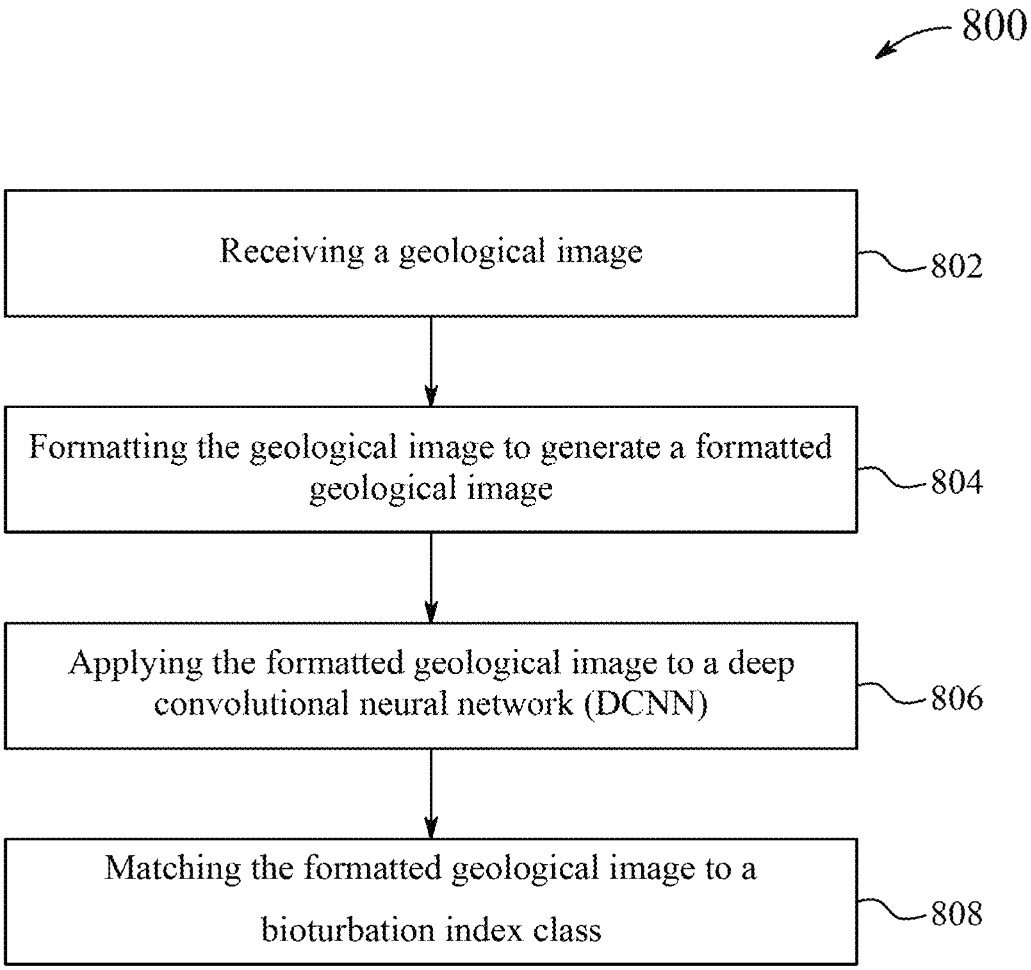
FIG. 8 illustrates a method for ichnological classification of geological images, according to aspects of the present disclosure.

FIG. 8 illustrates a method 800 of ichnological classification of geological images, according to one or more aspects.

At step 802, the method 800 includes receiving a geological image. In an aspect, the computing device 102 may be configured to receive the geological image.

At step 804, the method 800 includes formatting the geological image to generate a formatted geological image. According to aspects of the present disclosure, the computing device 102 may format the geological image to generate a formatted geological image.

At step 806, the method 800 includes applying the formatted geological image to the DCNN 106 trained to classify bioturbation indices. According to aspects of the present disclosure, the computing device 102 may apply the formatted geological image to the DCNN 106. The deep convolutional neural network (DCNN) 110 may be trained to classify bioturbation indices associated with the geological image.

At step 808, the method 800 includes matching the formatted geological image to a bioturbation index class. According to aspects of the present disclosure, the computing device 102 may match the formatted geological image to a bioturbation index class.

The first embodiment is illustrated with respect to FIGS. 1-8. The first embodiment describes a method of ichnological classification of geological images described. The method includes receiving a geological image, by a computing device 102 having circuitry including a memory storing program instructions and one or more processors configured to perform the program instructions, formatting the geological image to generate a formatted geological image, applying the formatted geological image to a deep convolutional neural network (DCNN) 106 trained to classify bioturbation indices, and matching the formatted geological image to a bioturbation index class.

The bioturbation index classes include unbioturbated images, moderately bioturbated images, and intensely bioturbated images.

The unbioturbated images have no visible bioturbation.

The moderately bioturbated images have 1% to 30% bioturbation.

The intensely bioturbated images have 31% to 100% bioturbation.

The method further includes formatting the geological image by resizing the image to match an image input size of the DCNN 106.

The DCNN 106 is trained on a training set of geological images pre-labeled with bioturbation indices. Further, the DCNN 106 classifies the training set into bioturbation index classes.

The method further includes augmenting the training set before applying the training set to the DCNN 106, wherein augmenting includes any one of rotating, cropping, flipping, scaling and shifting.

The method further includes augmenting the training set by randomly selecting an image to augment. Further, the method includes step of applying a horizontal flip to the selected image to generate a flipped image and adding the flipped image to the training set.

Each geological image of the training set is a 224×224 pixel, with three color channels. The three-color channels comprise a red channel, a blue channel, and a green channel. Each geological image of the training set having low-level features including lines, edges and dots and high level features including objects. The low-level features (lines, edges, or dots) are extracted by the convolution filters in the shallow parts of the network. In the deeper parts, high-level features such as objects are more detectable. This is the reason why feature extraction is more problem-specific in the deeper levels of the network.

The method further includes applying the formatted image to a series of 3×3 convolution filters, wherein each convolution filter generates a set of weights, freezing the weights of a first portion of the series of 3×3 convolution filters, training the weights of a second portion of the series of 3×3 convolution filters using the training set, and recognizing, by the DCNN, the objects.

The method further includes dividing the first portion into four blocks of the 3×3 convolution filters, the four blocks including a first block, a second block, a third block and a fourth block, applying max pooling to the first block to downsample the training set to 112×112 pixel images, applying max pooling to the second block to downsample the 112×112 pixel images to 56×56 pixel images, applying max pooling to the third block to downsample the 56×56 pixel images to 28×28 pixel images; and applying max pooling to the second block to downsample the 28×28 pixel images to 14×14 pixel images.

The method further includes dividing the second portion into a fifth block of the 3×3 convolution filters, training the weights of each of the 3×3 convolution filters of the fifth block, and applying max pooling to the fifth block to downsample the 14×14 pixel images to 7×7 pixel images.

The method further includes flattening the 7×7 pixel images to generate a one dimensional array of pixel images, applying the one dimensional array to a classifier, matching the one dimensional array to a bioturbation class, and outputting the bioturbation index for each geological image of the training set.

The method further includes determining whether each formatted geological image includes one of a single layer of strata and a plurality of layers of strata. When the formatted geological image has a single layer of strata, applying the formatted geological image to the DCNN 106 to match the formatted geological image to a bioturbation index class. When the formatted geological image includes a plurality of layers of strata: identifying one or more strata layers within the formatted geological image, measuring a thickness of each strata layer of the formatted geological image, determining the bioturbation index of the formatted geological image by calculating an average bioturbation index, $BI_{avg}$, given by:

$$BI_{avg} = \frac{(T_a \times BI_a) + (T_b \times BI_b)}{\sum T}$$

where $T_a$ is a thickness of a first strata layer, $T_b$ is a thickness of a second strata layer, $BI_a$ is the biturbation index of the first strata layer, $BI_b$ is the bioturbation index of the second strata layer and ΣT is a thickness of the formatted geological image.

The second embodiment is illustrated with respect to FIGS. 1-8. The second embodiment describes a system for ichnological classification of geological images. The system includes a computing device having circuitry including a memory storing program instructions and one or more processors configured to perform the program instructions, a training set of geological images pre-labeled with bioturbation indices, and a deep convolutional neural network (DCNN) 106 operatively connected to the computing device, wherein the DCNN is trained on the training set of pre-labeled bioturbation indices to recognize bioturbation classes in a geological image.

Further, the system 100 includes a series of 3×3 convolution filters located within the DCNN 106. The series of 3×3 convolution filters is divided into blocks, wherein each 3×3 convolution filter is configured generate a set of weights, a max pooling layer within the DCNN 106, wherein the max pooling layer is configured to downsample an output of each block, a flattening layer within the DCNN 106, wherein the flattening layer is configured to generate a one dimensional array of pixel images from an output of a last block, and a classifier in the DCNN 106, wherein the classifier is configured to match the one dimensional array of pixel images to a bioturbation class and generate a bioturbation index.

The third embodiment is illustrated with respect to FIGS. 1-8. The third embodiment describes a non-transitory computer readable medium having instructions stored therein that, when executed by one or more processors, cause the one or more processors to perform a method of ichnological classification of geological images. The method includes receiving a geological image by a computing device having circuitry including a memory storing program instructions and one or more processors configured to perform the program instructions, formatting the geological image to generate a formatted geological image, applying the formatted geological image to a deep convolutional neural network (DCNN) 106 trained to classify bioturbation indices, and matching the formatted geological image to a bioturbation index class.

The non-transitory computer readable medium method further includes determining whether each formatted geological image includes one of a single layer of strata and a plurality of layers of strata, when the formatted geological image has a single layer of strata, applying the formatted geological image to the DCNN 106 to match the formatted geological image to a bioturbation index class, and when the formatted geological image includes a plurality of layers of strata, identifying one or more strata layers within the formatted geological image, measuring a thickness of each strata layer of the formatted geological image, determining the bioturbation index of the formatted geological image by calculating an average bioturbation index, $BI_{avg}$, given by:

$$BI_{avg} = \frac{(T_a \times BI_a) + (T_b \times BI_b)}{\sum T}$$

where $T_a$ is a thickness of a first strata layer; $T_b$ is a thickness of a second strata layer, $BI_a$ is the biturbation index of the first strata layer, $BI_b$ is the bioturbation index of the second strata layer and $\Sigma T$ is a thickness of the formatted geological image.

Next, further details of the hardware description of the computing environment of FIG. 1 according to exemplary embodiments is described with reference to FIG. 9.

Figure 9:
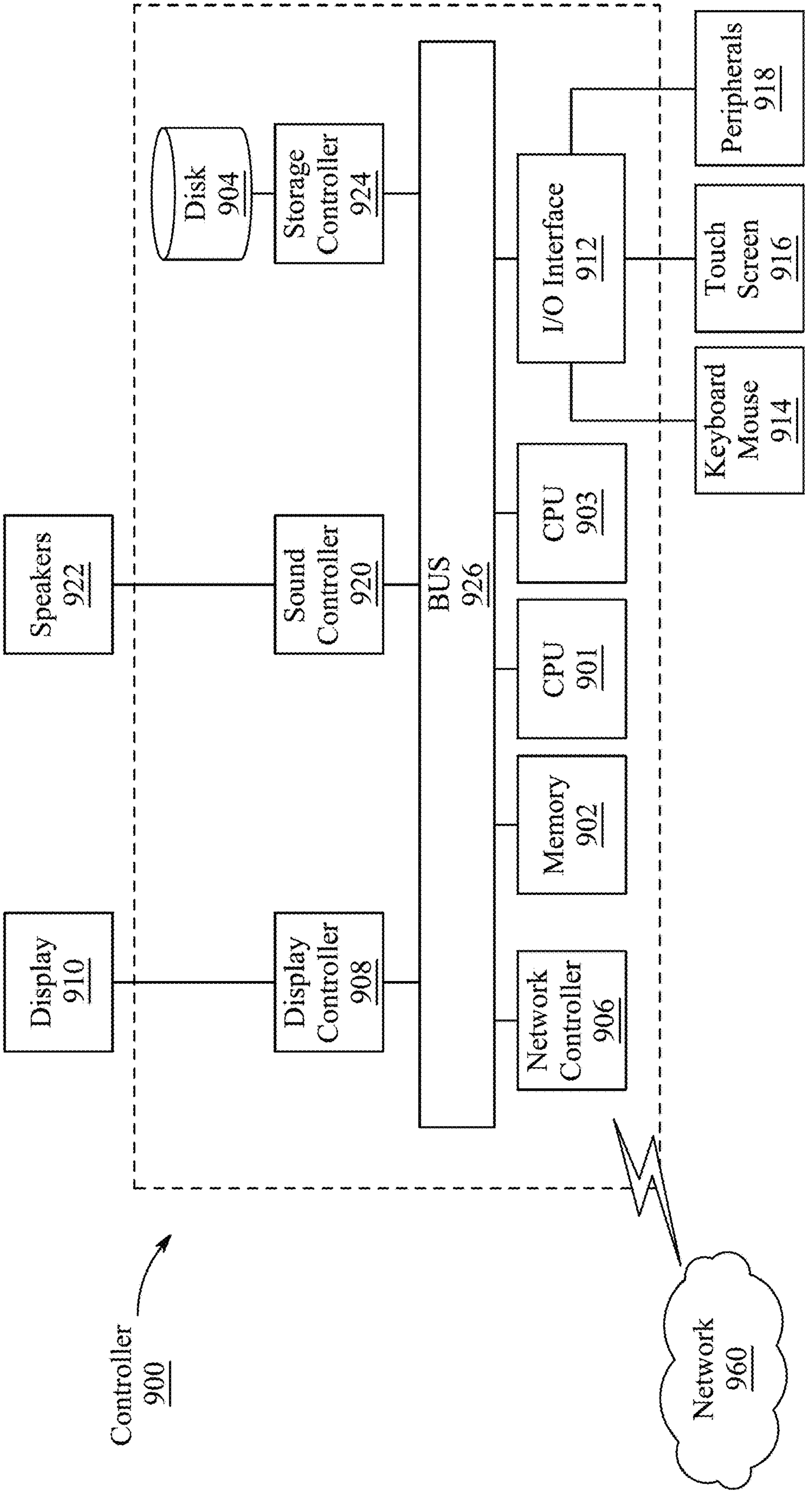
FIG. 9 is an illustration of a non-limiting example of details of computing hardware used in the computing system, according to aspects of the present disclosure.

In FIG. 9, a controller 900 is described is representative of the system 100 of FIG. 1 in which the controller is a computing device which includes a CPU 901 which performs the processes described above/below.

FIG. 9 is an illustration of a non-limiting example of details of computing hardware used in the computing system, according to exemplary aspects of the present disclosure. In FIG. 9, a controller 900 is described which is a computing device (that includes, computing device 102 and the DCNN 106) and includes a CPU 901 which performs the processes described above/below. The process data and instructions may be stored in memory 902. These processes and instructions may also be stored on a storage medium disk 904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 901, 903 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of ordinary skill in the art would recognize. Further, CPU 901, 903 may be implemented as multiple processors cooperatively working in parallel to perform the instructions of the inventive processes described above.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network such as an LAN or WAN network, or any combination thereof and can also include PSTN or ISDN subnetworks. The network 960 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general-purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
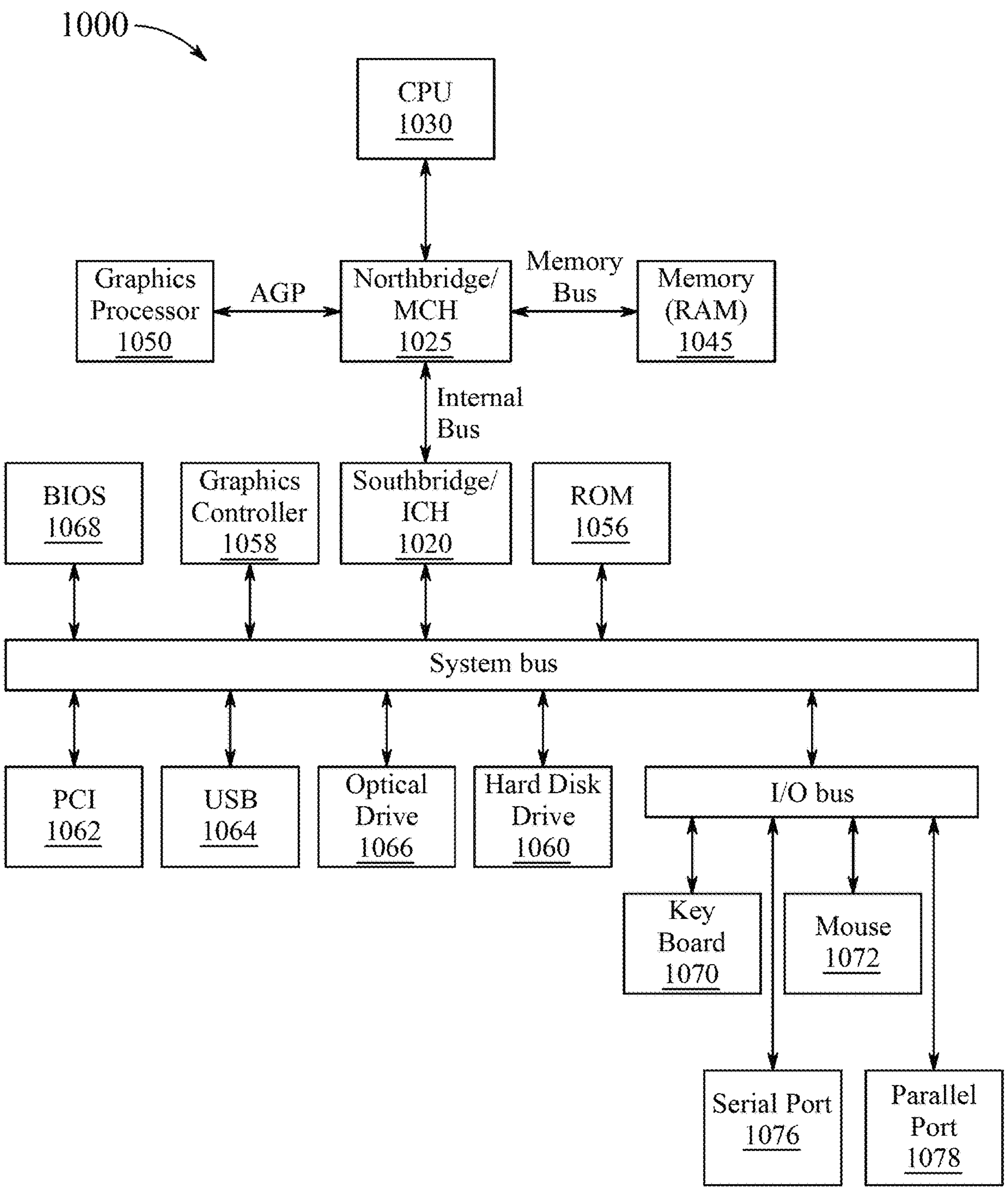
FIG. 10 is an exemplary schematic diagram of a data processing system used within the computing system, according to aspects of the present disclosure.

FIG. 10 shows a schematic diagram of a data processing system 1000 used within the computing system, according to exemplary aspects of the present disclosure. The data processing system 1000 is an example of a computer in which code or instructions implementing the processes of the illustrative aspects of the present disclosure may be located.

In FIG. 10, data processing system 1080 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 1045 via a memory bus, and connects to the graphics processor 1050 via an accelerated graphics port (AGP). The NB/MCH 1025 also connects to the SB/ICH 1020 via an internal bus (e.g., a unified media interface or a direct media interface). The CPU Processing unit 1030 may contain one or more processors and even may be implemented using one or more heterogeneous processor systems.

Figure 11:
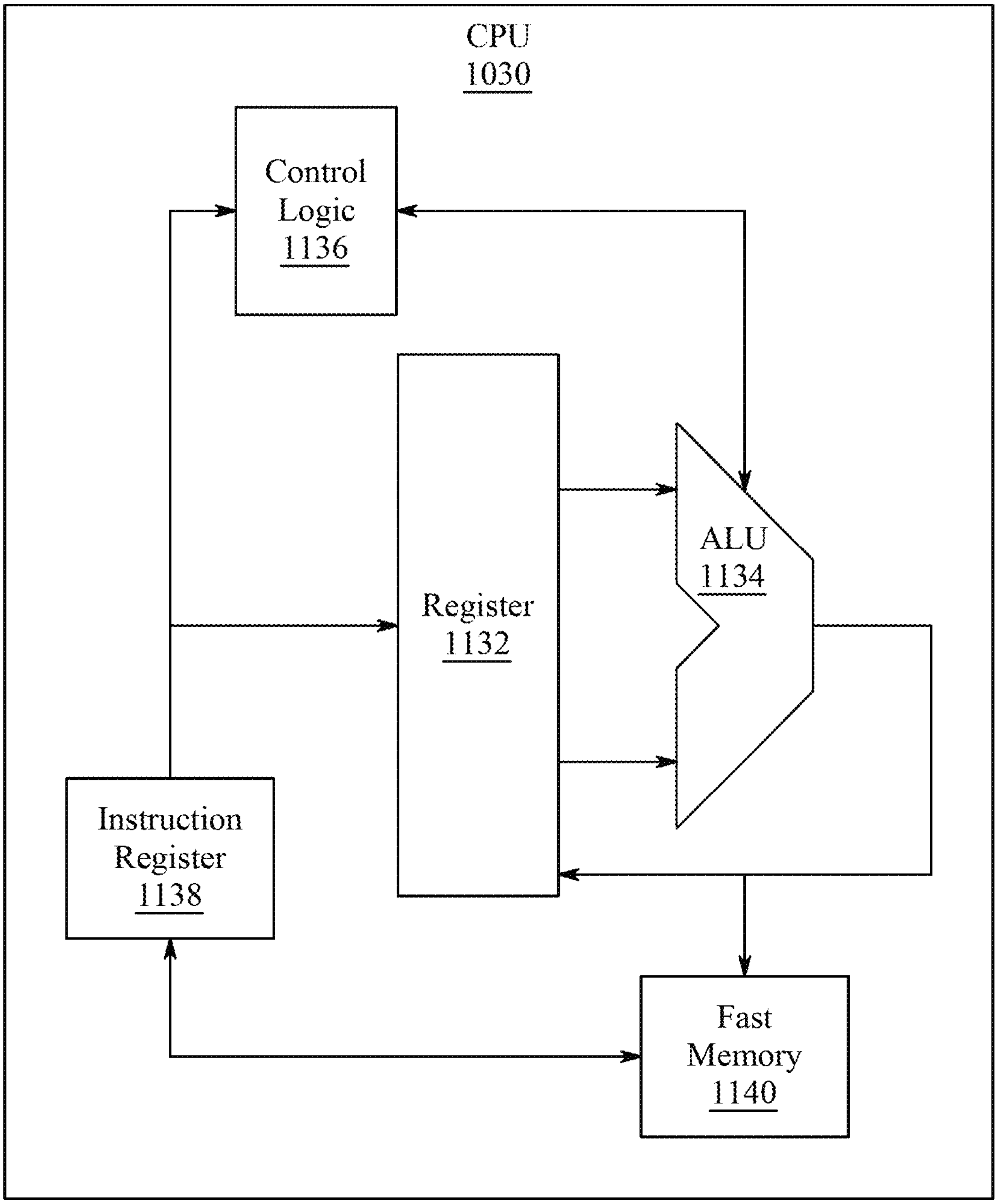
FIG. 11 is an exemplary schematic diagram of a processor used with the computing system, according to aspects of the present disclosure.

For example, FIG. 11 shows one aspects of the present disclosure of CPU 1030. In one aspects of the present disclosure, the instruction register 1138 retrieves instructions from the fast memory 1140. At least part of these instructions is fetched from the instruction register 1138 by the control logic 1136 and interpreted according to the instruction set architecture of the CPU 1030. Part of the instructions can also be directed to the register 1132. In one aspects of the present disclosure the instructions are decoded according to a hardwired method, and in another aspect of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain aspects of the present disclosures, the instruction set architecture of the CPU 1030 can use a reduced instruction set architecture, a complex instruction set architecture, a vector processor architecture, a very large instruction word architecture. Furthermore, the CPU 1030 can be based on the Von Neuman model or the Harvard model. The CPU 1030 can be a digital signal processor, an FPGA, an ASIC, a PLA, a PLD, or a CPLD. Further, the CPU 1030 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 10, the data processing system 1080 can include that the SB/ICH 1020 is coupled through a system bus to an I/O Bus, a read only memory (ROM) 1056, universal serial bus (USB) port 1064, a flash binary input/output system (BIOS) 1068, and a graphics controller 1058. PCI/PCIe devices can also be coupled to SB/ICH 1020 through a PCI bus 1062.

The PCI devices may include, for example, Ethernet adapters, add-in cards, and PC cards for notebook computers. The Hard disk drive 1060 and CD-ROM 1056 can use, for example, an integrated drive electronics (IDE) or serial advanced technology attachment (SATA) interface. In one aspects of the present disclosure the I/O bus can include a super I/O (SIO) device.

Further, the hard disk drive (HDD) 1060 and optical drive 1066 can also be coupled to the SB/ICH 1020 through a system bus. In one aspects of the present disclosure, a keyboard 1070, a mouse 1072, a parallel port 1078, and a serial port 1076 can be connected to the system bus through the I/O bus. Other peripherals and devices that can be connected to the SB/ICH 1020 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 12:
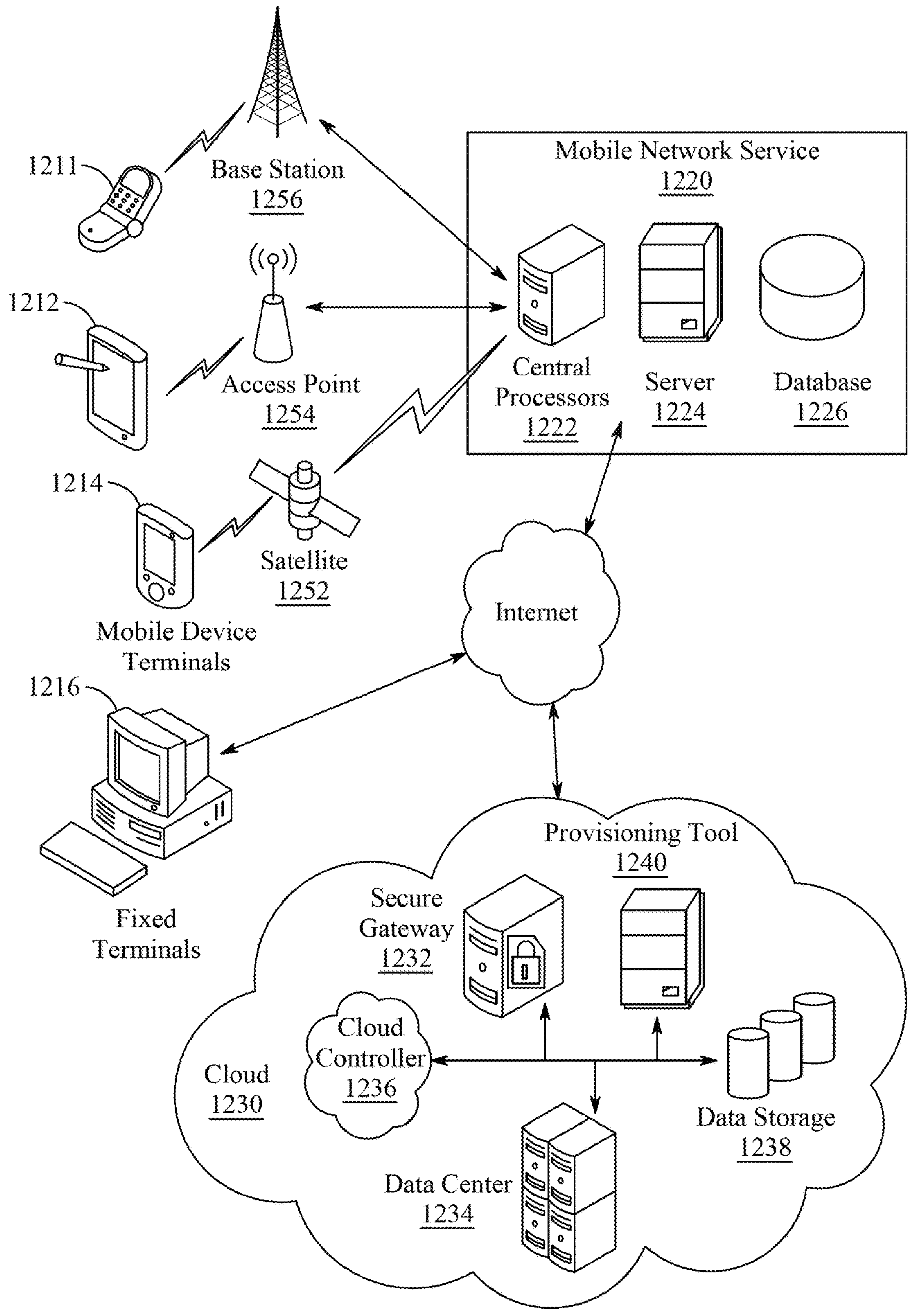
FIG. 12 is an illustration of a non-limiting example of distributed components that may share processing with the controller, according to aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 12, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A method of determining an ichnological classification of subsurface geological images, comprising:

collecting a geological image from a subsurface core, receiving the geological image with a computing device having circuitry including a memory storing program instructions and one or more processors configured to perform the program instructions;

formatting, by the computing device, the geological image to generate a formatted geological image;

applying the formatted geological image to a deep convolutional neural network (DCNN) trained to classify bioturbation indices; and matching, by a classifier of the DCNN, the formatted geological image to a bioturbation index class, wherein the DCNN is trained on a training set of geological images pre-labeled with bioturbation indices and classifies the training set into bioturbation index classes, wherein each geological image of the training set is a 224×224 pixel, three channel image, wherein the three channels comprise a red channel, a blue channel and a green channel, and each geological image of the training set has low-level features including lines, edges and dots and high level features including objects, applying the formatted geological image to a series of 3×3 convolution filters, wherein each convolution filter generates a set of weights;

freezing the weights of a first portion of the series of 3×3 convolution filters;

training, using the training set, the weights of a second portion of the series of 3×3 convolution filters; and recognizing, by the DCNN, the objects.

2. The method of claim 1, wherein the bioturbation index classes include:

unbioturbated images;

moderately bioturbated images; and intensely bioturbated images.

3. The method of claim 2, wherein the unbioturbated images have no visible bioturbation.

4. The method of claim 2, wherein the moderately bioturbated images have 1% to 30% bioturbation.

5. The method of claim 2, wherein the intensely bioturbated images have 31% to 100% bioturbation.

6. The method of claim 1, further comprising:

formatting the geological image by resizing the image to match an image input size of the DCNN.

7. The method of claim 1, further comprising:

augmenting, by the computing device, the training set before applying the training set to the DCNN, wherein augmenting includes any one of rotating, cropping, flipping, scaling and shifting.

8. The method of claim 7, further comprising:

augmenting the training set by randomly selecting an image to augment;

applying a horizontal flip to the selected image to generate a flipped image; and adding the flipped image to the training set.

9. The method of claim 7, further comprising:

augmenting the training set by randomly selecting an image to augment;

applying a 10% shift to one of a height and a width of the selected image to generate a shifted image; and adding the shifted image to the training set.

10. The method of claim 1, further comprising:

dividing the first portion into four blocks of the 3×3 convolution filters, the four blocks including a first block, a second block, a third block and a fourth block;

applying max pooling to the first block to downsample the training set to 112×112 pixel images;

applying max pooling to the second block to downsample the 112×112 pixel images to 56×56 pixel images;

applying max pooling to the third block to downsample the 56×56 pixel images to 28×28 pixel images; and applying max pooling to the fourth block to downsample the 28×28 pixel images to 14×14 pixel images.

11. The method of claim 10, further comprising:

dividing the second portion into a fifth block of the 3×3 convolution filters;

training the weights of each of the 3×3 convolution filters of the fifth block; and applying max pooling to the fifth block to downsample the 14×14 pixel images to 7×7 pixel images.

12. The method of claim 11, further comprising:

flattening the 7×7 pixel images to generate a one dimensional array of pixel images;

applying the one dimensional array to a classifier;

matching the one dimensional array to a bioturbation class; and outputting the bioturbation index for each geological image of the training set.

* * * * *